United States Patent [19]

Alvarez

[11] Patent Number: 5,293,985
[45] Date of Patent: Mar. 15, 1994

[54] CLEANING DEVICE FOR DRY CLEANING CONVEYOR

[76] Inventor: Rick E. Alvarez, 8101 E. Torin St., Long Beach, Calif. 90808

[21] Appl. No.: 881,098

[22] Filed: May 11, 1992

[51] Int. Cl.$^5$ .............................................. B65G 45/00
[52] U.S. Cl. ..................................... 198/496; 15/21.1; 15/88.1; 15/256.5
[58] Field of Search ................ 198/494, 496; 104/279, 104/280; 15/21.1, 88.1, 88.3, 256.5

[56] References Cited

U.S. PATENT DOCUMENTS

| | | | |
|---|---|---|---|
| 3,229,808 | 1/1966 | Olson | 15/88.3 X |
| 3,641,618 | 2/1972 | Rainey et al. | 15/312.1 |
| 3,786,779 | 1/1974 | Brunel et al. | 15/312.1 X |
| 3,819,032 | 6/1974 | Preuss et al. | 198/496 X |
| 3,858,715 | 1/1975 | Brock et al. | 198/496 |
| 4,091,492 | 5/1978 | Thomson et al. | 15/21.1 X |
| 4,678,075 | 7/1987 | Bowman, Jr. | 198/496 |
| 5,117,968 | 6/1992 | Rivera | 198/496 |

FOREIGN PATENT DOCUMENTS

| | | | |
|---|---|---|---|
| 1323481 | 7/1987 | U.S.S.R. | 198/494 |
| 2174350 | 11/1986 | United Kingdom | 198/496 |

*Primary Examiner*—Cheryl L. Gastineau
*Attorney, Agent, or Firm*—Christie, Parker & Hale

[57] ABSTRACT

A cleaning device for a dry cleaning conveyor frame and yoke assembly includes a pair of brushes positioned on each side of the frame and yoke, a central brush for contacting rollers on the yoke assembly, a support assembly for the device, and a vacuum source communicating with the brushes. The support assembly fixes the device to a cross arm of the support structure for the conveyor. The vacuum force is distributed to each brush by a manifold and hoses that communicate with the manifold. Preferably, the side brushes are resiliency-biased against the frame and yoke.

12 Claims, 7 Drawing Sheets

CLEANING DEVICE FOR DRY CLEANING CONVEYOR

BACKGROUND OF THE INVENTION

The present invention relates to a cleaning device for a dry cleaning laundry storing conveyor and, in particular, a cleaning device using brushes and a vacuum source.

A dry cleaning conveyor includes a fixed track formed by several rods formed into an elongated oval shape, a supporting system for holding the track in place above the ground, and a frame connected to a roller or yoke assembly for movement in either direction along the track under motor control. The motor typically moves sprocketed wheels at either end of the track, the sprocketed wheels engaging the frame and thus conveying it. Clean clothing placed on a hanger and covered in plastic hangs from slots in the frame.

The frame and roller assembly collect dust and other dirt over time. This dirt often will fall, and some will get on the clean clothing, usually through the hole in the plastic covering through which the hanger passes. If this happens, the customer will often insist that the clothing be recleaned at no charge. To avoid this, it is necessary to periodically clean the yoke and frame.

The typical way to clean these moving parts is to run the conveyor while holding a vacuum brush against one side of the frame and/or yoke. The same process is repeated while holding the brush on the other side of the frame and/or yoke, and once again with a brush against the rollers. This labor-intensive activity is undesirable.

SUMMARY OF THE INVENTION

The present invention provides a cleaning device for a dry cleaning conveyor frame and yoke assembly. The device includes a pair of brushes positioned on each side of the frame and yoke, and a central brush for contacting rollers on the yoke assembly. The pair of brushes and central brush are fixed to a device support assembly which is further fixed to a cross arm of a support structure for the conveyor track.

The brushes communicate with a vacuum source via hoses and a manifold for distributing vacuum force to each hose and brush. Preferably, the pair of brushes are resiliently biased towards one another and thus towards the frame. In addition, the central brush has a pivotable mounting with at least a small amount of rotation accommodated.

DETAILED DESCRIPTION OF THE PREFERRED EMBODIMENT

The invention provides a cleaner for a frame and yoke assembly including the wheels of a dry cleaning laundry storing conveyor.

Figure 1:
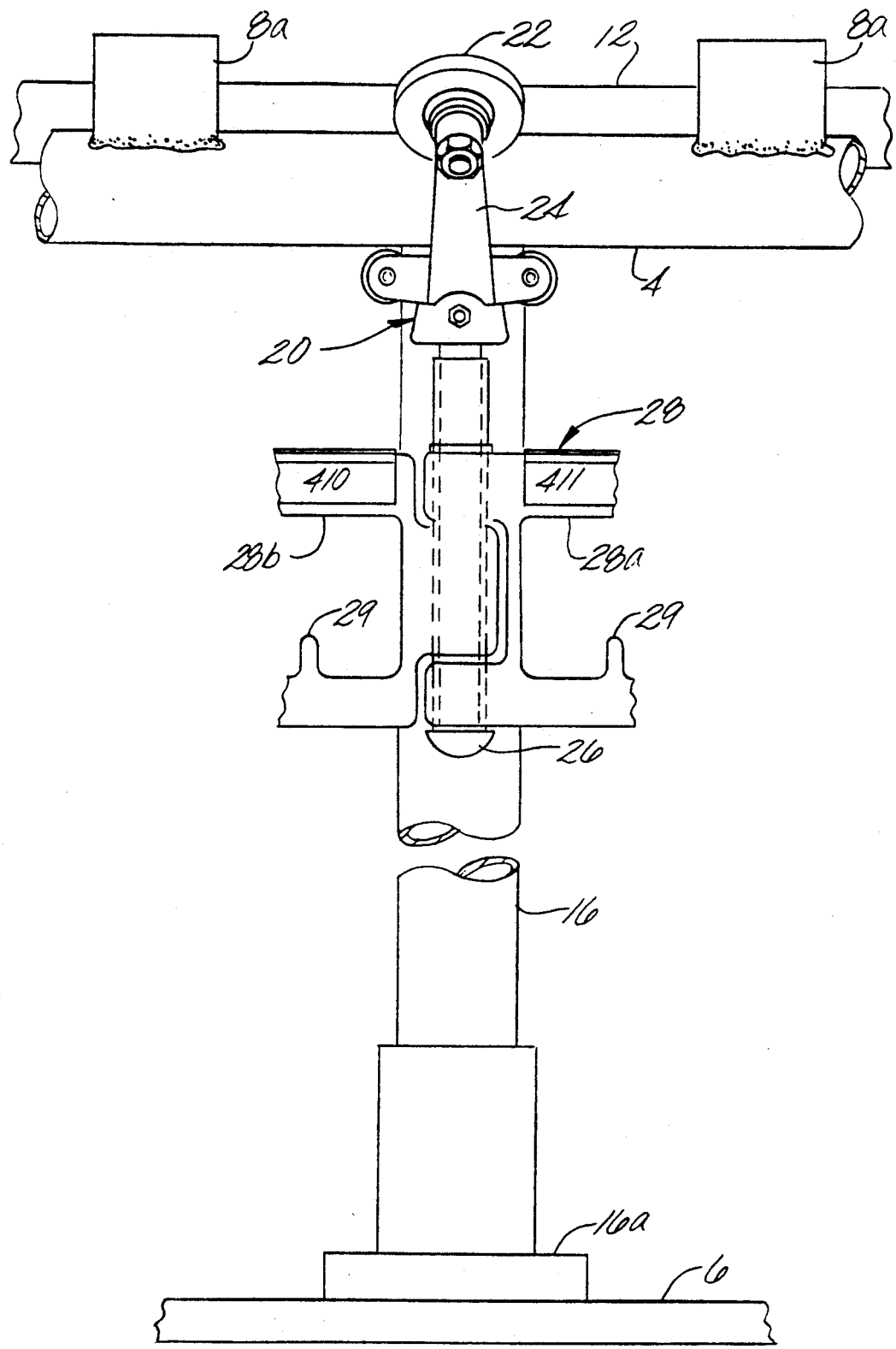
FIG. 1 is an elevational view of a portion of a conventional dry cleaning conveyor, including a support structure, yoke and frame assembly, and a track.
Figure 2:
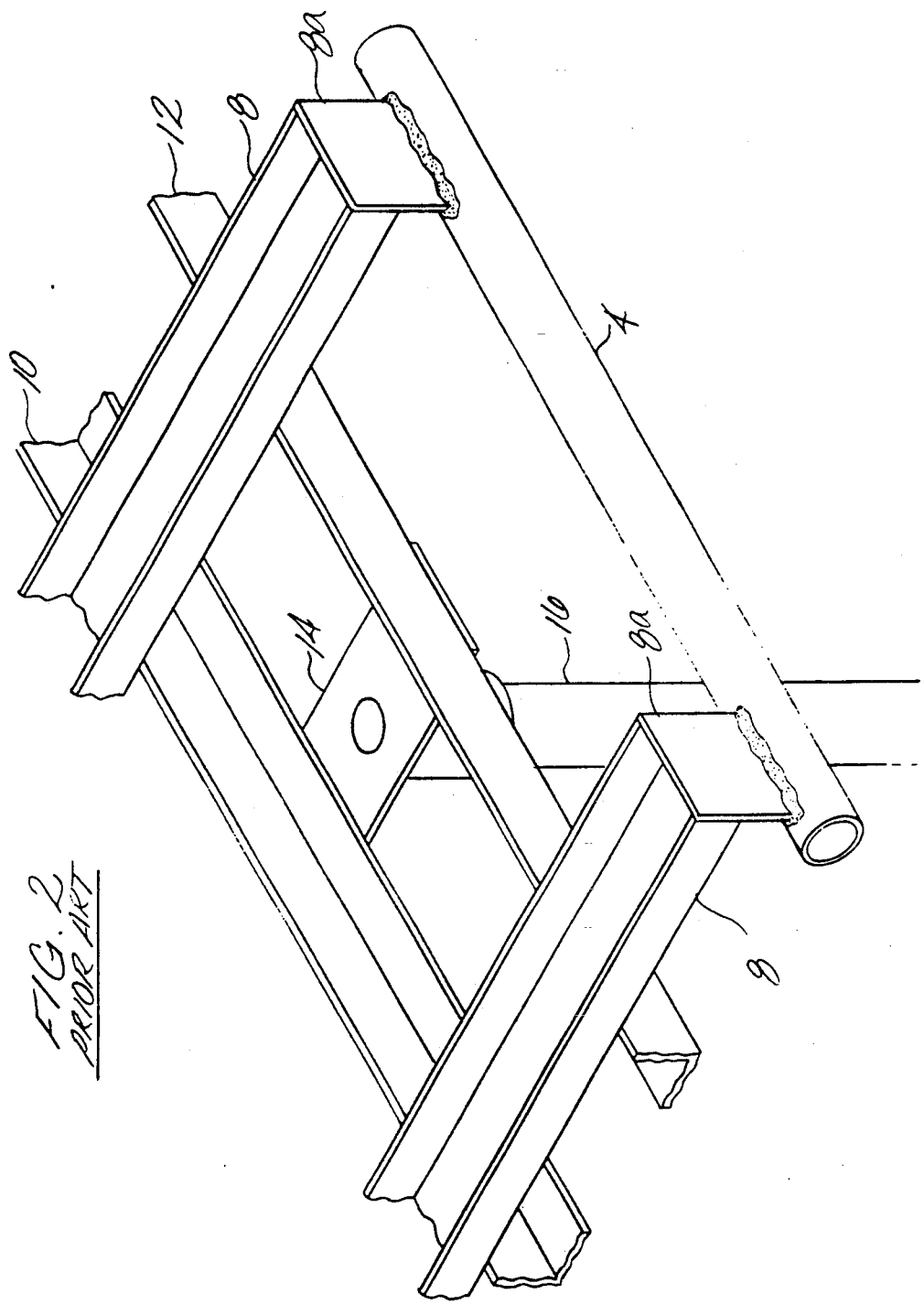
FIG. 2 is a top perspective view of a segment of the support structure and track of the conveyor of FIG. 1.

FIGS. 1 and 2 show major aspects of a conventional conveyor. Typically, the conveyor has an elongated oval track formed by several rods, one such rod 4 being shown. The rod 4 is suspended above floor 6 by a support structure including a plurality of cross arms 8 having vertical mounting plates 8a at each end. The mounting plates are welded to the top of rod 4. The cross arms 8 are supported by two angle members 10 and 12 which, in turn, are supported on a plate 14 fixed to the top of a column 16. Column 16 has a base 16a fixed to the floor 6.

Yoke assembly 20 includes two rollers 22 rotatably mounted on a U-shaped bracket 24. The yoke assembly 20 is rotatably fixed by a pin 26 to a frame 28. The pin 26 also serves to rotatably connect segments 28a, 28b of the frame 28. The frame has slots defined by projections 29 in each segment.

A cleaning device according to the invention will now be described with reference to FIGS. 3 and 4. The device includes a vacuum source 32, a pair of side brushes 34, 36 and a central brush 38, and a structure sufficient to communicate the vacuum source with the brushes and to mount the device adjacent the rod 4.

The mounting structure includes a long mounting plate 40 bolted to a step-shaped mounting bracket 42 having a top portion bolted to plate 40 from below and a lower portion fitted into a channel formed by cross arm 8. A U-shaped clamping member 44 then slides over the cross arm. Tightening T-screws 46 clamps the bottom portion of the step-shaped bracket 42 against cross arm 8. Instead of a step-shaped member 42, a two-piece structure may be used, including a plate which is as long as the stepped bracket to replace the upper step, and a block to replace the lower step and the rise between steps.

At a front end of elongated mounting plate 40, a brush supporting assembly is attached. An L-shaped bracket 50 having a horizontal portion 50a and a slot 50b is bolted to plate 40. Nuts may be used to secure the bolts so that the brush assembly can be adjusted in a forward and back direction. A U-shaped bracket 54 is fixed to a vertical portion of bracket 50 by, e.g., bolts. The U-shaped bracket 54 attaches to a mounting block 58 having a bore therethrough. This bore is coaxial with bores in the legs of the U-shaped bracket 54. Outside of each leg of U-shaped bracket 54, the top portion of side brush mounting plates 60, 62 (or rocker arms) are fastened. The top portion of these plates 60, 62 has a further axial bore aligned with the bores in the U-shaped bracket 54 and block 58. A pin 64 passes through the bores and is fixed by, e.g., a bolt threaded to the far end of the pin. There is a small gap between the bottom of the U-shaped member 54 and the mounting block 58 so that block 58 can rotate on pin 64 at least a small amount. Rotation would thus end by the top or bottom edge of block 58 contacting the base of the U-shaped bracket 54. Alternatively, the top and bottom edges of block 58 may be rounded, and stoppers may be provided.

Brushes 34, 36 are mounted at the bottom of plates 60, 62 in positions opposing one another. The V-shaped central brush 38 is mounted to a block 68 which is, in turn, fixed by welding, epoxying, or other means to mounting block 58. A spacing plate 70 may be interposed between blocks 58, 68.

In accordance with an aspect of the invention, the brushes 34, 36, and 38 communicate with vacuum source 32 so that dirt and dust stirred up by the bristles will be pulled through the brushes to the vacuum source. While the device may be used without suction, suction is preferred. In the disclosed embodiment, vacuum source 32 is positioned on the floor 6, and it connects via a hose 74 to a manifold 76. The manifold divides the vacuum force among plural hoses leading to the brushes. In the disclosed embodiment, manifold 76 distributes the vacuum force to three hoses 78, 80, and 82. Hose 78 friction fits over, or into, a hose mount 78a of the manifold 76. Hoses 80 and 82 fit over, or into, hose mounts 80a, 82a, respectively. Hose clamps or other means may be used to tighten these connections. The other end of hose 78 fits over a pipe 84 which passes through block 68 and is integrally or unitarily formed with a hollow triangular prism 38a of brush 38. The area where pipe 84 connects to block 38a may have extra support for the connection provided, such as a thickened area or web.

The hollow block 38a has openings 38b which communicate with an area in the center of the bristles 38c. A T-screw 68a presses against pipe 84 to hold it in place. Loosening T-screw 68a allows vertical adjustment of brush 38. Hose 82 fits into an elbow 88 which further connects to a pipe 90 supported by and passing through vertical plate 60. Pipe 90 connects to brush 34, as described later. Pipe 90 communicates the vacuum force with an area surrounded by the bristles 34a, similar to brush 38. Hose 80 connects to brush 36 in the same manner.

The vertical adjustment of the top brush 38 using the T-screw allows the brush to be positioned optimally for contacting the wheels as well as for moving the brush out of the way when the device is not in use. Similar structure could be used for the side brushes. The rotation of block 58 gives the top brush a small amount of vertical resiliency, since the resiliency of the hose 78 presses the brush downward while allowing for substantially upward movements as the wheels move by the brush.

Figure 3:
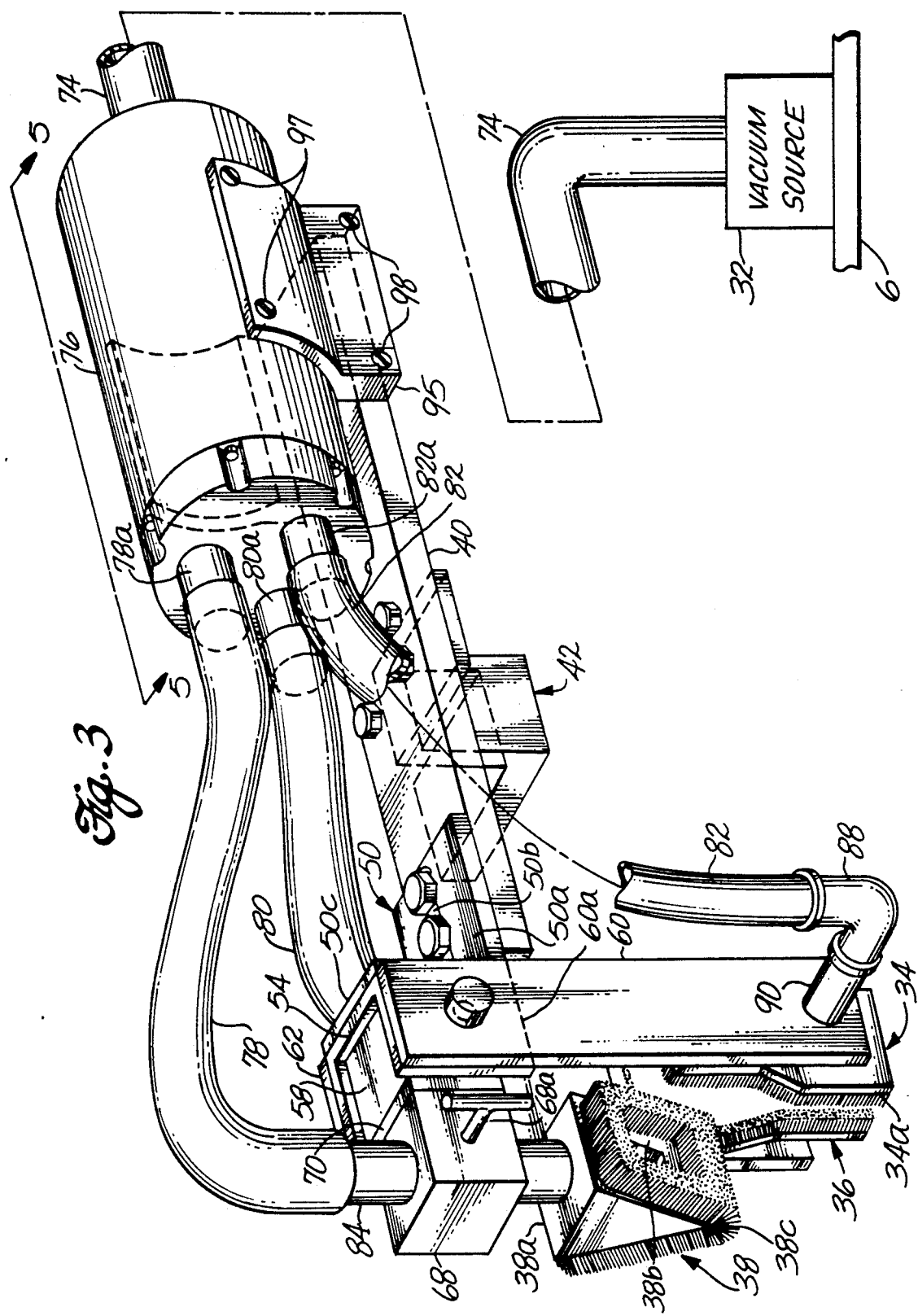
FIG. 3 is a side perspective view of a cleaning device according to the invention.
Figure 4:
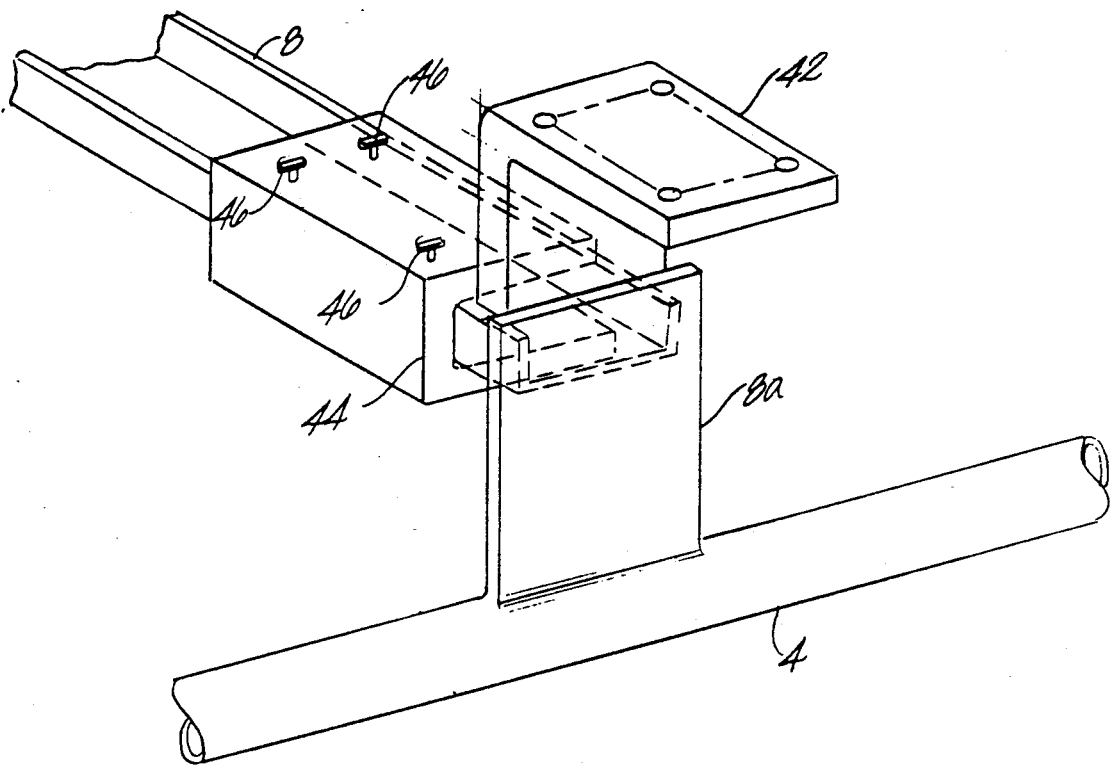
FIG. 4 is an enlarged perspective view of a mechanism for mounting the cleaning device of FIG. 3 to a cross arm of the support structure of the conveyor.

It can be seen in FIG. 3 that the upper brush 38 is not directly between or exactly aligned with the two side brushes 34, 36. Exact alignment is not critical to the invention. Nevertheless, it is preferred that the brushes be in near-exact alignment or at least close to alignment.

The manifold 76 is attached to the elongate mounting plate 40 by means of two brackets 95 and shallow screws 97 and deeper screws 98. Band clamps may be used to further secure the manifold.

Figure 5:
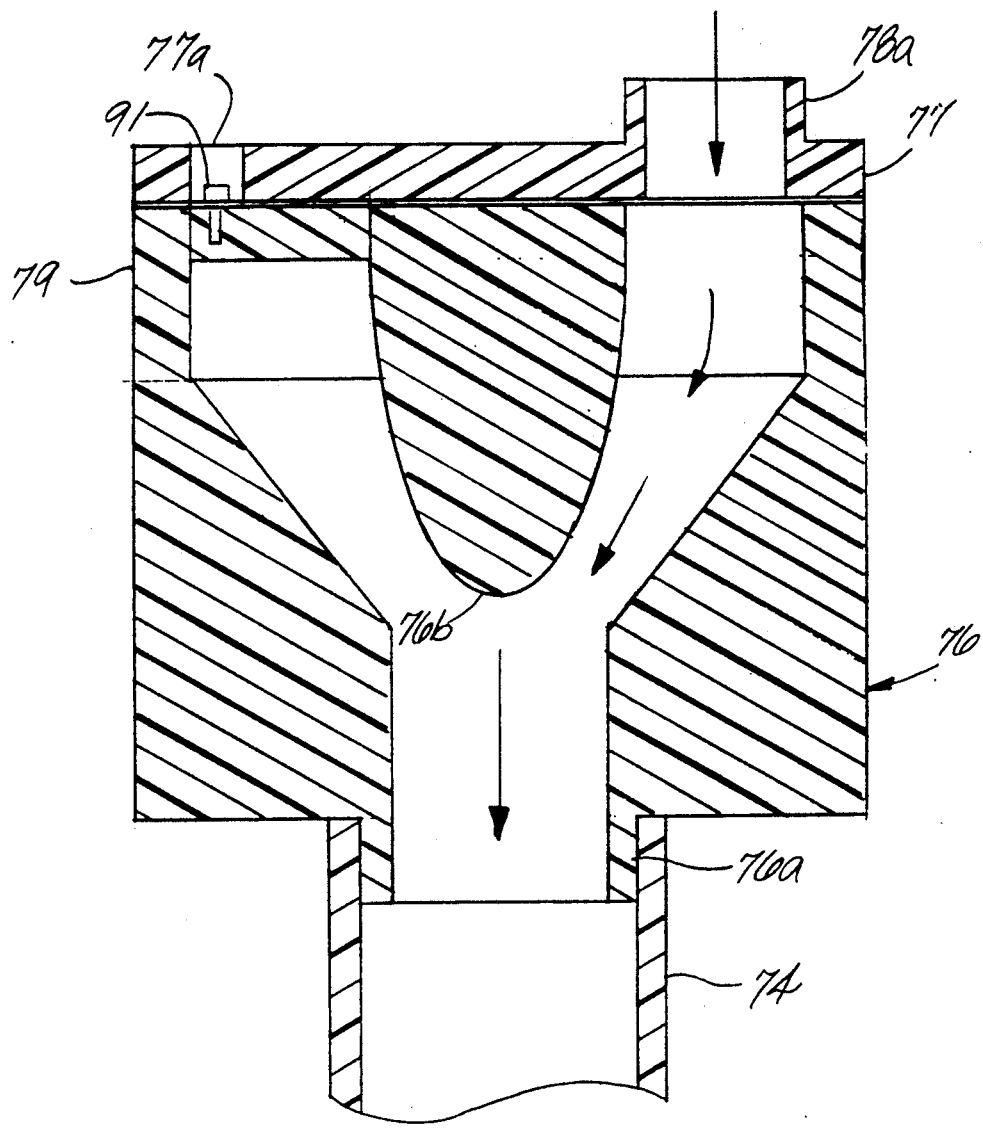
FIG. 5 is an enlarged sectional view of a manifold taken along the lines 5—5 of FIG. 3.

FIG. 5 shows a sectional view of the manifold 76. The manifold has a mounting cylinder 76a at its rear for connection to hose 74. The manifold 76 has a cap 77 at its front end where the mounting cylinders 78a, 80a, and 82a are integrally formed. This cap 77 may bolt to the of the main body 79 of the manifold 76 or attach by means of three screws 91 positioned in channels 77a of cap 77. The main body 79 preferably has a somewhat cone-shaped element 76b integrally formed therewith to help distribute the vacuum force. This cone-shaped element 76b may alternatively be part of cap 77, with main body 79 having an appropriate aperture at the center of its front end to receive cone-shaped element 76b.

The exterior and interior corners of the bristles of each brush are preferably rounded for better airflow and suction. Therefore, the side brushes and bristles could even be formed with an oval shape. In addition, due to the bend in the side brushes, the bristles may tend to interfere with one another in certain places. This could reduce the cleaning efficiency of the device. Therefore, the oval pattern of the bristles could be formed by two U-shaped groups of bristles, with the ends of one U positioned outside the ends of the other U in the area of the bend.

Figure 6:
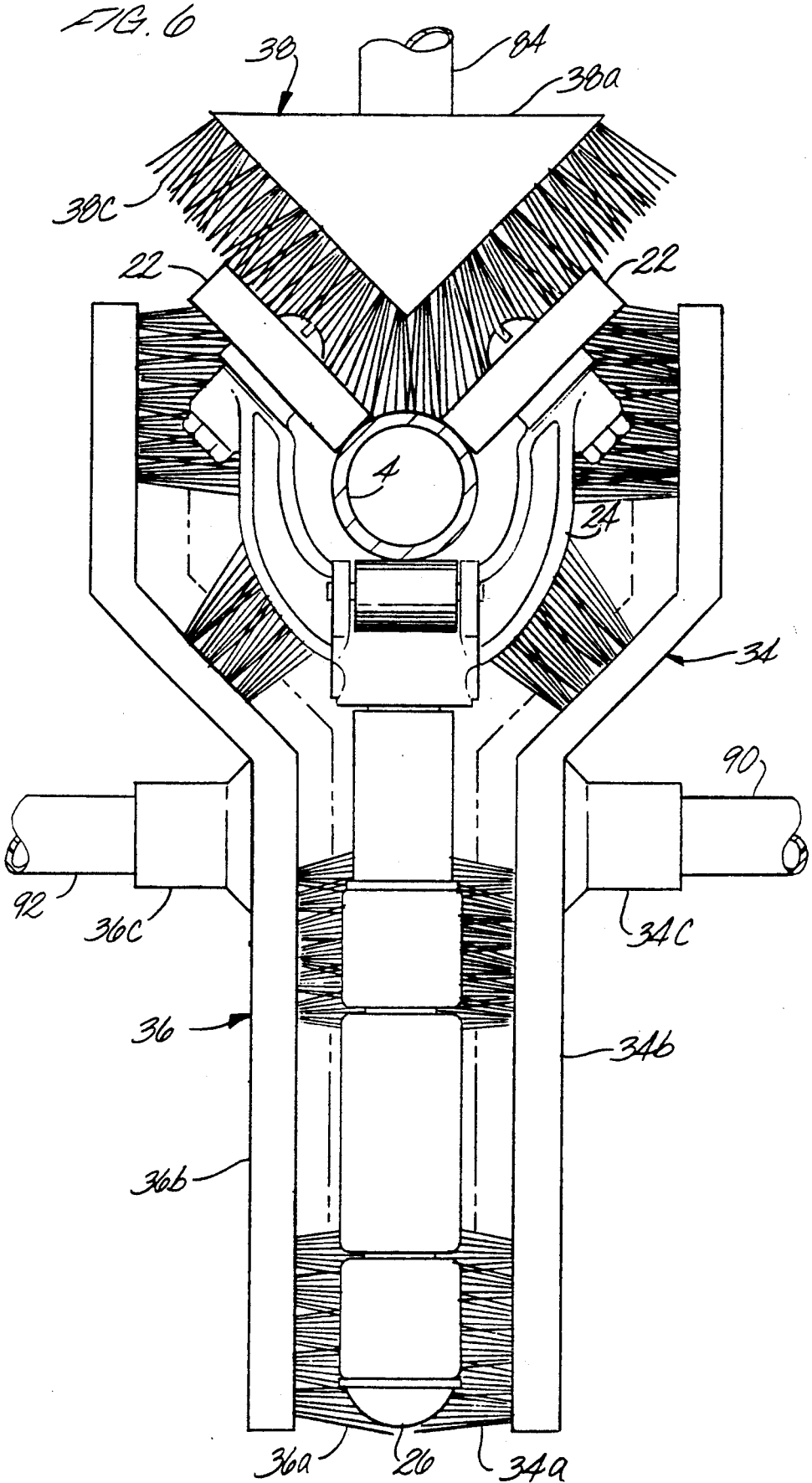
FIG. 6 is a front view of the brushes of the device of FIG. 3 contacting the frame and the yoke assembly of FIG. 1.

FIG. 6 shows the device in action where the brushes 34, 36 and the top V-shaped brush 38 contact the frame, yoke, and rollers 22. This figure also shows the connection of pipes 90, 92 to brushes 34, 36 by means of cylindrical extensions 34c, 36c (preferably reinforced by thickened areas or webs) into which the pipes 90, 92 friction-fit. Of course, these pipes could also fit over the extensions, as desired. Preferably, the brush bristle holding members 34b, 36b are integral with the extensions 34c, 36c. All of the elements of the device may be formed by a molded plastic, but other materials will do as well.

Another way to improve airflow is to taper the holes that communicate the area bounded by the bristles of each brush with the attached hose. These holes come from the rounded hose receiving cylinders 34c, 36c. The tapering is preferably done so as to form an elongated oval hole in the area bounded by the bristles.

It is preferred that the dimensions of the brush be such that the lower portion of the brush will be at the bottom of the frame and reach upward to the beginning of the U-shaped member 24. The bent portion then extends from the bottom of the U to where the legs of the U extend vertically. The upper straight portion then extends from that point to the top of the wheels 22. The center brush's bristles cover the inside of the wheels 22.

Figure 7:
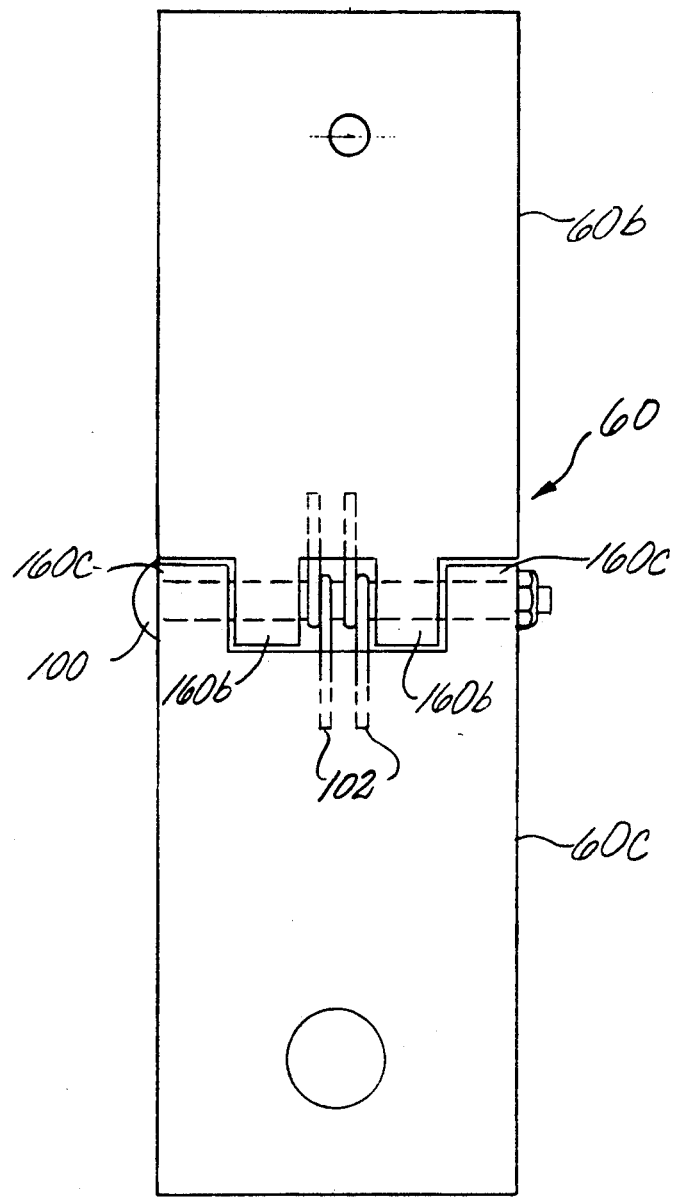
FIG. 7 is an enlarged view of a rocker arm for mounting a side brush according to the invention.

FIG. 7 shows one way to resiliently bias the vertical brush mounting plate or rocker arm 60, and the same structure is used for rocker arm 62. With renewed reference to FIG. 3 as well, line 60a is made to be a pivot point where a lower portion 60c of the rocker arm 60 is pivotably mounted to an upper portion 60b, and the lower portion 60c is resiliently biased toward the other rocker arm 62. The pivot point 60a may be lower on the rocker arm, as desired. The upper portion of the rocker arm 60b pivotably connects to the lower portion 60c by means of a pivot pin 100 which passes through bores formed in projections 160b, 160c from the upper and lower arms 60b, 60c. These projections 160b, 160c form a central space where two springs 102 are fixed around pivot pin 100 and also fixed to the upper and lower portions 60b, 60c of the rocker arm. An advantage of this structure is that it allows the brushes to be easily replaced without taking down the entire device.

Referring back to FIG. 6, it can be seen that when the frame, yoke and wheels are moving, and the brushes come in contact therewith as they pass, and the vacuum is on, the brushes will stir up dirt which will then be sucked through the hoses to the vacuum source. The preferred resilient bias of the side bushes leaves play for swaying and misalignment of the frame and/or yoke. The preferred rotatable connection of the upper brush 38 allows room for variations in the wheels 22 of each yoke assembly and provides resiliency. This structure is also adaptable to different types of conveyors.

It should be noted that the device will work in whichever direction the conveyor is run, without jamming. Therefore, the device can simply be indefinitely mounted on the cross arm and run, as necessary, without disrupting normal operation of the cleaners.

The invention is not limited to the disclosed embodiment. For example, the vacuum source can be positioned on an extension of mounting plate 40, or individual vacuum sources can be provided for each brush. In addition, the number of hoses may be varied, e.g., by using five hoses. The additional two hoses could be connected to upper portions of the two side brushes. Therefore, the present invention is defined by the appended claims.

What is claimed is:

1. A device for cleaning a rack and yoke assembly of a dry cleaning garment-carrying conveyor, the conveyor comprising a track for movement of the rack and yoke assembly, means for moving the rack and yoke, and a support for the track, the device comprising:
   a plurality of brushes for contacting the rack and yoke assembly;
   means for communicating a vacuum source with the brushes, the means for communicating comprising a hose for each brush;
   supporting means for holding the brushes in position in contact with the rack and yoke assembly; and
   means for fixing the supporting means to the support structure of the track.
   wherein two of the brushes each comprise a plate and bristles, each plate having an aperture formed therein for receiving one of the houses, the bristles being formed around the aperture, so as to prevent dirt loosened by the bristles from falling onto garments below.

2. The device of claim 1 wherein the rack and yoke assembly has wheels for riding along the track, and wherein there is a third brush which is supported by the supporting means in position for contacting the wheels as they pass by the device.

3. The device of claim 1 wherein the two brushes are for contacting opposite sides of the rack and yoke assembly.

4. The device of claim 2 wherein the two brushes are for contacting opposite sides of the rack and yoke assembly.

5. The device of claim 1 wherein there is a single vacuum source connected to the means for communicating the vacuum source with each of the hoses.

6. The device of claim 6 wherein there are three brushes and three hoses.

7. The device of claim 1 wherein the means for holding comprises means for resiliently biasing at least some of the brushes against the rack and yoke assembly.

8. The device of claim 2 wherein the means for holding comprises means for adjusting a vertical position of the brush for contacting the wheels.

9. The device of claim 8 wherein the supporting means comprises means for resiliently allowing limited substantially vertical movement of the third brush in communication with the wheels.

10. A device for cleaning a rack and yoke assembly of a dry cleaning laundry-carrying conveyor, the conveyor comprising a track for movement of the rack and yoke assembly, means for moving the rack and yoke, and a support for the track, the device comprising:
    a plurality of brushes for contacting the rack and yoke assembly;
    means for communicating a vacuum source with the brushes, the means for communicating comprising a hose for each brush;
    supporting means for holding the brushes in position in contact with the rack and yoke assembly; and
    means for fixing the supporting means to the support structure of the track,
    wherein two of the brushes comprise a plate and bristles, each of these two brushes being disposed on an opposite side of the rack and yoke assembly, and the supporting means comprising for each of the two brushes a rocker arm and a hinge and spring assembly connecting the rocker arm to a fixed portion of the supporting means for resiliently biasing each plate towards the rack and yoke assembly.

11. The device of claim 10 wherein there is a third brush, and the supporting means further comprises a block having an aperture formed therethrough for slidably accommodating the hose associated with the third brush, the block having a T-screw passing therethrough for engaging the hose to allow adjustment of the vertical position of the third brush.

12. The device of claim 11 wherein the block is fixed to a further block, and wherein the further block is rotatably mounted to the fixed portion of the supporting means, which fixed portion includes means for limiting the rotation of the further block, whereby substantially vertical free movement of the third brush is achieved for a limited distance.

* * * * *